United States Patent [19]
Wagner

[11] 3,729,140
[45] Apr. 24, 1973

[54] MOBILE IRRIGATION SPRINKLER APPARATUSES AND PROCESSES OF OPERATION THEREOF

[76] Inventor: Milton H. Wagner, Rt. 1, Brownfield, Tex. 79316

[22] Filed: July 19, 1971

[21] Appl. No.: 163,742

[52] U.S. Cl. ............................................. 239/212
[51] Int. Cl. ............................................. A01g 25/02
[58] Field of Search ............................... 239/212, 213

[56] References Cited

UNITED STATES PATENTS

| 3,512,548 | 5/1970 | Miller | 239/213 X |
| 2,889,948 | 6/1959 | Leuenberger | 239/212 X |
| 3,245,595 | 4/1966 | Purtell | 239/212 |
| 3,360,200 | 12/1967 | Purtell | 239/213 |

FOREIGN PATENTS OR APPLICATIONS

| 256,147 | 5/1964 | Australia | 239/213 |

Primary Examiner—Allen N. Knowles
Assistant Examiner—Gene A. Church
Attorney—Ely Silverman

[57] ABSTRACT

Tow type irrigation apparatuses and processes operating without anchors wherein the moving pipe train is automatically maintained in a straight line along one portion thereof and along another portion parallel thereto and longitudinally and laterally displaced therefrom while a third intermediate portion between is in a stable inverse curve form.

8 Claims, 21 Drawing Figures

Patented April 24, 1973

INVENTOR.
MILTON H. WAGNER
BY
Ely Silverman
ATTORNEY

Patented April 24, 1973

INVENTOR: MILTON H. WAGNER

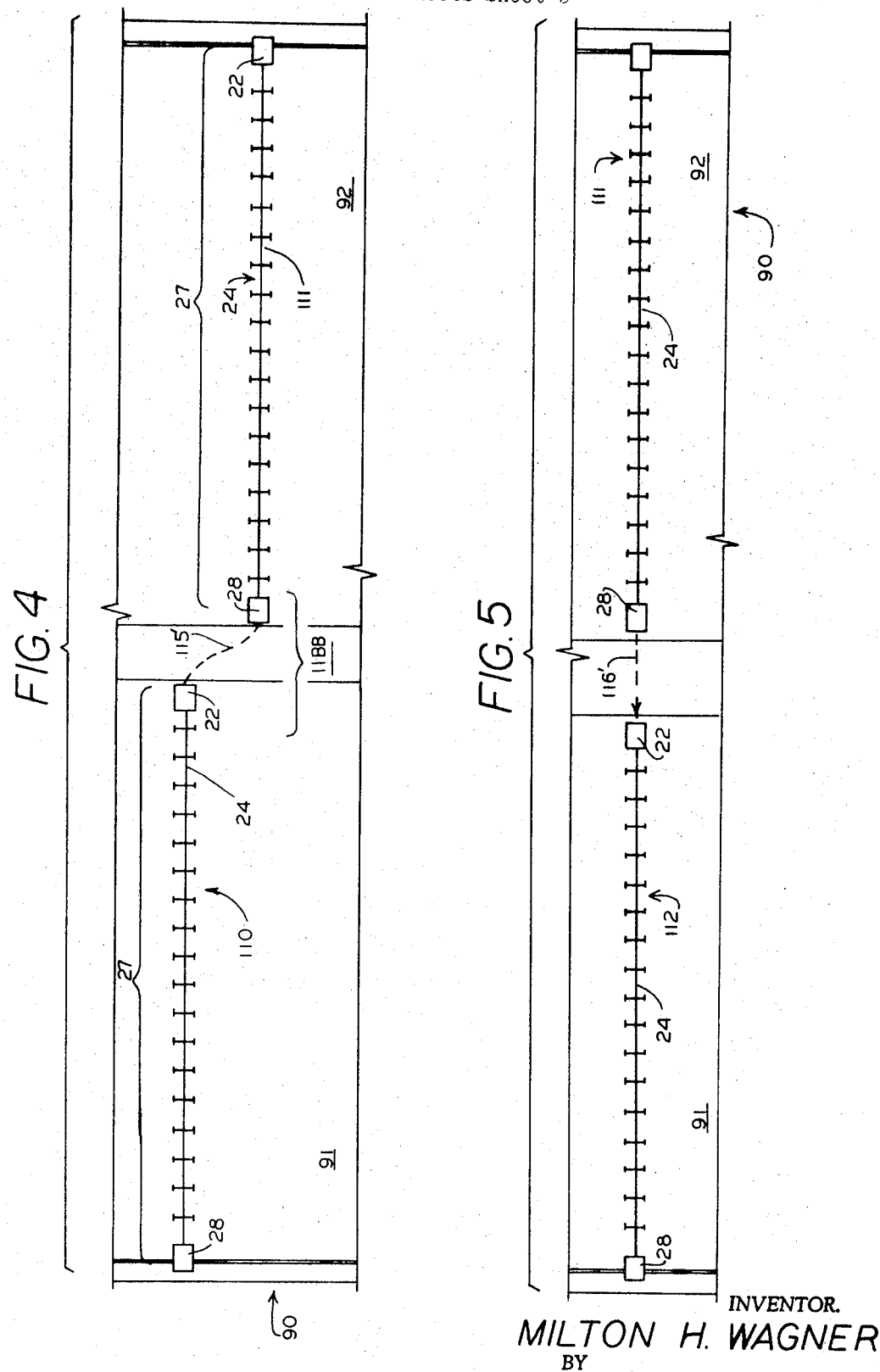

Patented April 24, 1973

INVENTOR.
MILTON H. WAGNER
BY
Ely Silverman
ATTORNEY

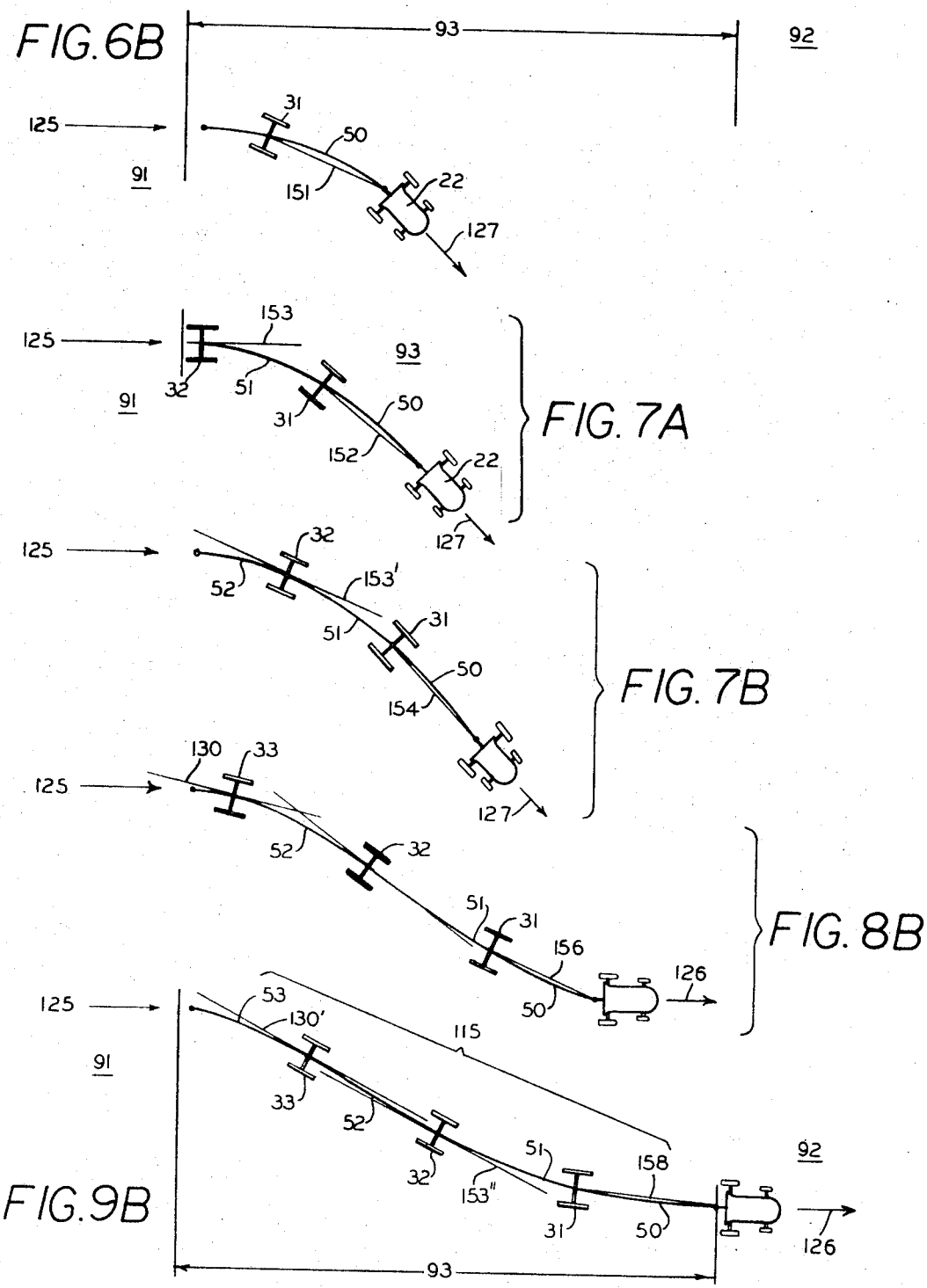

INVENTOR.
MILTON H. WAGNER
BY
Ely Silverman
ATTORNEY

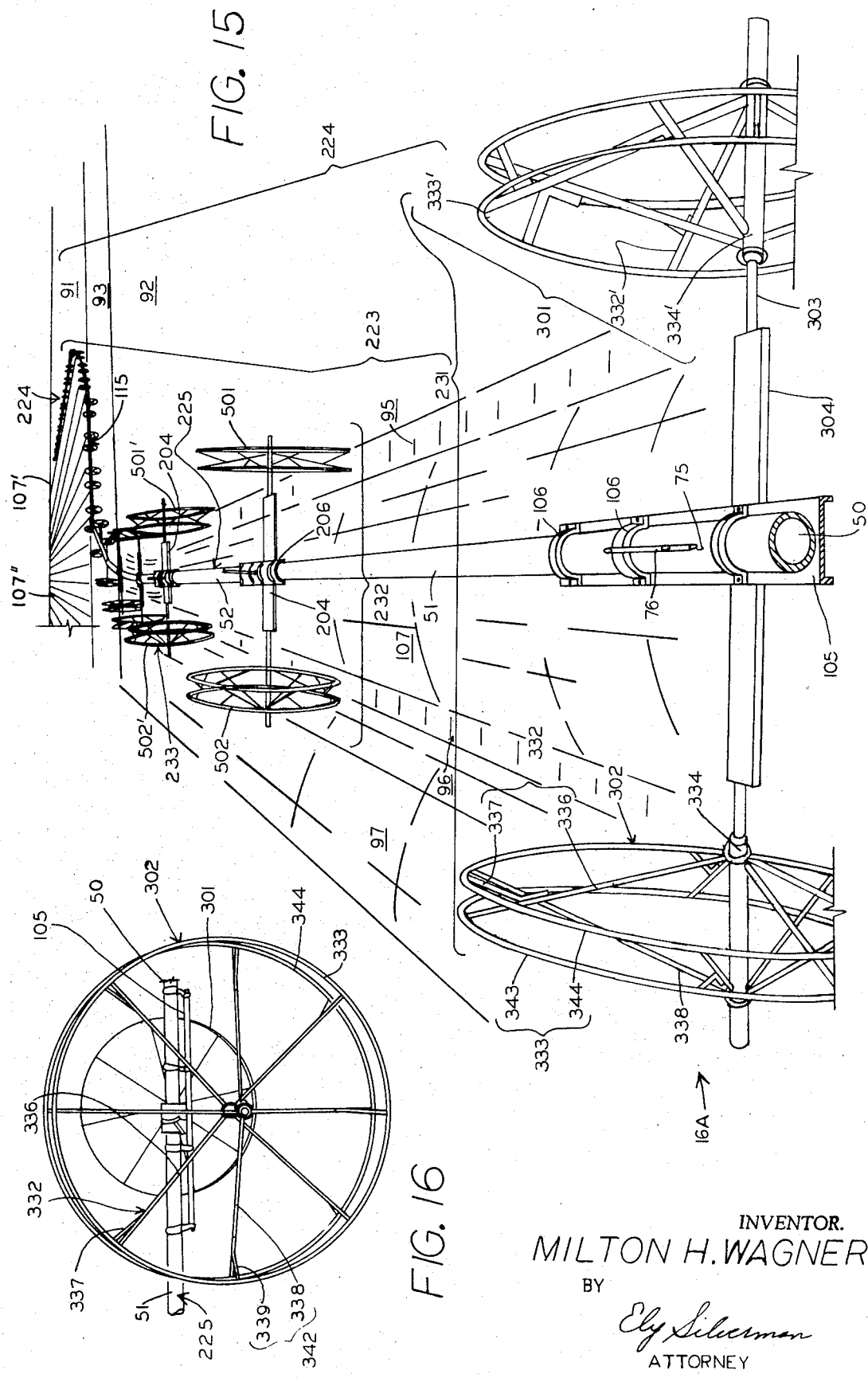

1

MOBILE IRRIGATION SPRINKLER APPARATUSES AND PROCESSES OF OPERATION THEREOF

CROSS REFERENCE TO RELATED APPLICATIONS

This in an improvement over my co-pending patent application Ser. No. 4,632 filed Jan. 21, 1970 now U.S. Pat. No. 3,640,462 issued Feb. 8, 1972.

BACKGROUND OF THE INVENTION

1. Field of the Invention

The field of art to which this invention pertains is procedures for fluid sprinkling or spraying by maneuver and also, apparatus comprising a series of joined fluid conductors with appropriate spray outlet means and a vehicular type support means secured thereto, the whole being such to conform to the contour of the terrain while being moved from area to area and while in spraying position.

2. Description of the Prior Art

Rotary moving irrigation systems (as in U. S. Pat. Nos. 3,394,739 and 2,604,359) and travelling irrigation systems that move transversely of the length of the pipe (as in U. S. Pat. No. 3,245,595) apply traction to the wheels thereof that are located in and engage wet land and, in moving thereover, damage the crops therebelow. The transversely moving types also have difficulty in maintaining alignment of the pipe in a straight line whereby to provide uniform distribution of irrigating water and the corrective action provided therein usually lags the obnoxious deviations. The circular travelling elements cover only about $\pi d2/4$ of a square field of side of length $d$, hence cover only about 78.5 percent of the area with uniformity. Tow type apparatuses as in U. S. Pat. No. 3,295,548 require anchors and the labor for such heavy work of placement is expensive, where available. This invention solves such problems by applying wheel traction to dry land and avoiding damaging contact with row crops and does not require the placement and/or removal and/or movement of anchors while using a reliable yet inexpensive structure that utilizes the commonly available farm tractor and inter section service road, and permits compensation for short periods of varying wind velocity and direction.

SUMMARY OF THE INVENTION

A tractor is maneuvered to force a bend in a moving wheeled pipe train while the pipe train wheels bite into or engage the ground along the area of its straight line movement and S-curved motion to hold the relative pipe position earlier impressed thereupon by movement of a tow tractor. In the continued phase of its operation the pipe train to a degree is treated as a non-rigid flexible element able to transmit force only parallel to the direction of the longitudinal axis thereof yet, as the pipe is firmly clamped to some of each of a series of wheel support backets and the pipe train wheels located to allow free rotation of each wheel, the curve earlier impressed on the curved segments of the pipe train is maintained while other portions of the train travel in laterally spaced apart straight paths;

BRIEF DESCRIPTION OF THE DRAWINGS

FIG. 2 diagrammatically shows the relative positions of parts of apparatus 21 in one set of two separate stages of one step of operation; FIG. 3 shows another, subsequent, set of stages in the subsequent step in the cycle of operation shown in FIG. 14.

FIGS. 4 and 5 show, in the overall, the positions of another apparatus 27 in the basic sequence of steps providing, on repetition, the full cycle of operation shown in FIG. 14; FIG. 4 shows the relative position of parts of apparatus 21 in one set of two separate stages of one step of operation; FIG. 5 shows another, subsequent, set of stages in the subsequent step in the cycle of operation shown in FIG. 14. FIGS. 4 and 5 thus show the array of parts of the embodiment of apparatus 27 in positions corresponding to positions shown in FIGS. 2 and 3 for embodiment 21.

Each of FIGS. 7, 8, 9, 10 and 11 is a diagrammatic top view of the position of parts of apparatus 21 initially in zone 6A through 11B of FIG. 2; FIGS. 6, 7, 8, 9, 10 and 11 show, respectively, sequential positions in the process of movement of apparatus 21 from the position shown at position 110 of apparatus 21 in FIG. 2 to the position 111 of apparatus 21 in FIG. 2.

FIGS. 6B, 7A, 8B, 8C and 9B are enlarged diagrammatic views in the zone 11B of FIGS. 2, 6, 7, 8, 9, 10 and 11 during motion of apparatus 21 from the position 110 thereof shown in FIG. 2 to the position 111 thereof shown in FIG. 2. Zone corresponding to 11B in FIG. 2 is shown as zone 11BB in FIG. 4. FIGS. 6B, 7A, 7B, 8B and 9B are drawn to a larger scale than FIGS 6 – 11.

FIG. 6B diagrammatically illustrates geometric relations of direction of tractor path, direction of path of wheels of wheeled units 31 and 32 and shape of pipe portions 50 and 51 in a position and stage of operation intermediate between those positions and stages shown in FIGS. 6 and 7 to a scale larger than that of FIGS. 6 and 7.

FIG. 7A diagrammatically illustrates geometric relations of direction of tractor path, direction of path of wheels of wheeled units 31 and 32 and shape of pipe portions 50 and 51 in the stage shown in FIG. 7. FIG. 7B diagrammatically illustrates geometric relations of direction of tractor path, direction of path of wheels of wheeled units 31 and 32 and shape of pipe portions 50, 51 and 52 in a stage intermediate between those stages shown in FIGS. 7 and 8.

FIG. 8B diagrammatically illustrates geometric relations of direction of tractor path, direction of wheels of wheeled units 31, 32 and 33, shape of pipe portions 50, 51, 52 and 53 in a stage intermediate between those stages shown in FIGS. 8 and 9 at the time of the initiation of an inverse curve in the pipe string 25.

FIG. 9B diagrammatically illustrates geometric relations of direction of tractor path, direction of path of wheels of wheeled units 31, 32 and 33 shape of pipe portions 50, 51, 52 and 53 in a state intermediate between those stages shown in FIGS. 9 and 10.

FIG. 15 is a pictorial representation of the wheeled pipe train assembly portion 224 as in apparatus 21 during a stage of its operation shown in FIG. 11 as seen along vertical plane or section 1A—1A thereof.

FIG. 16 is a pictorial side view representation of a wheeled unit or station 231 of the pipe train assembly portion 224 as seen along direction of arrow 16A of FIG. 15 after a 45° turn counterclockwise from the position of parts shown in FIG. 15 of wheel 302.

DESCRIPTION OF THE PREFERRED EMBODIMENTS

Figure 1:
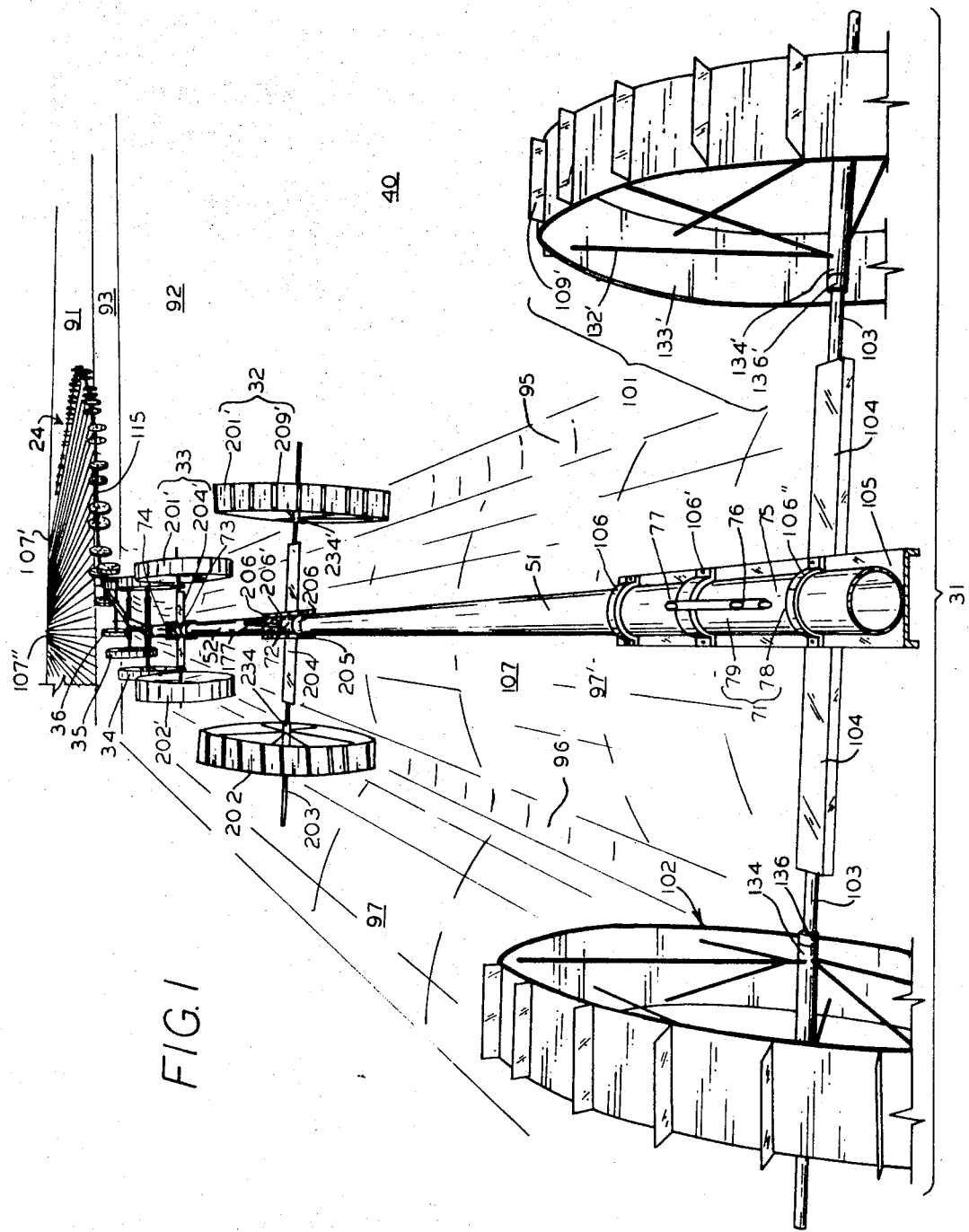
FIG. 1 is a pictorial representation of the wheeled pipe train assembly portion 24 of apparatus 21 during a stage of its operation shown in FIG. 11 as seen along plane 1A—1A thereof.

Generally, the apparatus 21 of this invention comprises, in operative combination, a tractor 22 and a wheeled pipe train as assembly 24, the wheeled pipe train assembly 24 comprises a plurality of wheeled units 23 and a pipe string assembly 25. The group of wheeled units 23 comprises a leading end or front wheel unit 31 and a series of like trailing units as 32, 33, 34, 35, 36, 37, 38 and 39, 41, 42, 43 and a trailing end or rear unit as 44 like unit 31. The pipe string subassembly 25 comprises a series of like serially connected pipe units as 51, 52, 53, 54, 55, 56, 57, 58, 59, 61, 62 and 63 between, respectively, units 31 and 32, units 32 and 33, 33 and 34, 34 and 35, 35 and 36, 36 and 37, 37 and 38, 38 and 39, 39 and 40, 40 and 41, 41 and 42, 42 and 43 and 43 and 44; and one end pipe unit 64 projecting rearwardly of the end unit 44; and another end pipe unit, 50, which extends forwardly of the front wheeled unit 31. Pipe unit 51 is located between wheel units 31 and 32 and is firmly connected to pipe unit 50 at its front and unit 52 at its rear and is attached at its front end to unit 31 and at its rear end to unit 32. Another wheeled pipe train 224 is below described.

Each of the pipe units in the spring 25 are similarly serially connected to the serially adjacent pipe string unit and similarly attached to the wheel units (or stations) adjacent the end thereof as is unit 51.

In the embodiment 21, the overall length from front end of pipe unit 50 to the rear end of pipe unit 64 is 1,300 feet. The pipe units, except front and rear ends, are all of the same length, same outside and inside diameter, same wall thickness and same rigidity and flexibility and same material. The wheeled units are only 30 feet apart hence the number of wheeled units is 44. Each of front pipe units 50 and 51 is one 50 foot length and the rear end unit 64 and its adjacent unit is 50 feet long: accordingly, the wheeled units specifically referred to (32–43) and pipe units therebetween (51–63) are exemplary of such like wheeled and pipe units and typical rather than being the complete list of such units. Nevertheless the description of operation and structure of wheeled units here described is typical of operation of all such units of apparatus 21.

Each wheeled unit of assembly 24 comprises a pair of ground engaging wheels, a wheel supported axle, a bracket supported on the axle and a clamp base supported on the bracket. Each consecutive portion of the pipe string is supported on the consecutive one in the series of such wheeled units.

Wheeled unit 31 comprises a vertically extending left wheel 101, and an identical right wheel 102; each wheel comprising a horizontally extending journal as 134 and 134', the journals each rotatably supporting one end of a rigid horizontal axle 103.

Each of the wheels, as 102 (and 101 and 201 and 202 and 201' and 202') in assembly 24 is alike in size, shape and components and comprises a rigid wheel rim as 133, a plurality of spokes as 132 and a journal 134 operatively connected as in wheel 102 (corresponding parts are shown on wheel 101, correspondingly numbered with a ' as 134'), with cleats as 109 on each rim. Another wheel structure is used in pipe train 224.

Each axle as 103 supports a rigid horizontally extending bracket as 104; the bracket 104 has a U-shaped steel section. The axle 103 is firmly yet rotatably attached therein, journals 134 and 134' rotate separately about axle 103 laterally of the end of bracket 104. A rigid clamp base 105, formed of a rigid U-shaped steel channel, about 4 feet long in the particular embodiment 21 herein described, extends along the length of the pipe string, and is attached, as by a plurality of like clamps 106, 106' and 106" to the portions of the pipe string adjacent thereto and supports such pipe string portion.

In the first and last of the wheeled units, 31 and 44, of assembly 24 the base, as 105, is pivotally supported on the bracket as 104 by a vertically extending cylindrical pivot pin 108 so that the bracket 104 and the wheel elements attached thereto may pivot about the vertical axis passing through the center of that pivot pin.

Each wheeled unit as 32 through 43 comprises a left wheel 201, a right wheel 202 (like 101 and 102 respectively, and each comprising a journal as 234 and 234' (like 134 and 134') such journals rotatably supporting a horizontal axle 203 (like 103). The axle 203 supports a bracket 204' (like 104); the bracket 204' (like 104) is a U-shaped rigid steel section. The axle 203' is firmly yet rotatably attached therein. A clamp base 205' (like 105) is formed of a rigid U-shaped steel channel and is attached as by clamps as 206, 206' and 206" (like 106, 106' and 106") to the portions of the pipe string adjacent thereto and support such pipe string portion.

Generally, in each of the trailing wheeled units 32 through 43 the base thereof as 205 is firmly fixed to and supported on the bracket thereof as 204 so that such bracket and the elements of such wheeled unit attached thereto may not pivot about a vertical axis passing through such base and such bracket. More particularly, in the trailing wheeled units as 32 through 43 the bracket element as 204 (referred to as 204' and 204" to indicate the corresponding like units in the assembly other than 32) is firmly attached as by welding to the clamp base of such unit, as 205 (and 205' and 205" respectively), so that no rotation occurs therebetween.

The portions of the pipe string each comprise a relatively flexible portion of pipe as 51 each provided with a connection joint as 71 between adjacent pipe elements 51 and 50 and connection joint 72 between elements 52 and 53, a like joint element 73 between pipe elements as 53 and 54 and joint element as 74 between elements as 54 and 55. The joint elements comprise a firmly connecting mechanical fitting as 78 and a seal 79. Each seal as 79 provides a watertight seal between adjacent lengths of pipe and is supported by and affixed to the joint, the joint and adjacent one to two feet of pipe is supported by and attached to and held in place relative to each other by the base as 105 and its clamps as 106, 106' and 106'' and 106'''.

Each fitting as 78 is provided with a boss 75 in which is located a rigid standpipe 76 with a sprinkler head 77 thereabove. The head may provide for a rectangular distribution of water therefrom or a circular distribution of water with a radius of spray that slightly overlaps the area covered by spray from the sprinkler head on the adjacent wheeled unit.

Each of the wheels as 101, 102 and 201, 202 is fixed as to position along the length of its axle as 103 and 203 by collar rings as 136 centrally and 137 laterally (shown on 103) which are held by lock nuts to the axle, yet are movable along the axle. Thereby the position of each of the wheels as 101 and 102 is adjustable along its axle as 103 so that the wheels of assembly 24 move in the parallel furrows as 95 and 96; accordingly, hillocks of the earth as 97 and 97' forming the row crop seed bed between such furrows will be straddled by each wheeled unit travelling along the straight parallel and spaced apart paths as 125 and 126 to and from positions as 110, 111, 112 and 113.

A 30 foot pipe that bends 2½ feet (1¼ feet from each end if supported at its center) develops a curve of pipe with a radius of about 90 feet and the lines of travel 125 and 126, if about 40 feet apart, requires no more than three stations or wheel units to form an S-curve; a more gradual curve may be formed as shown in FIG. 1 but 40 feet from position 110 to 112 is usual.

Figure 2:
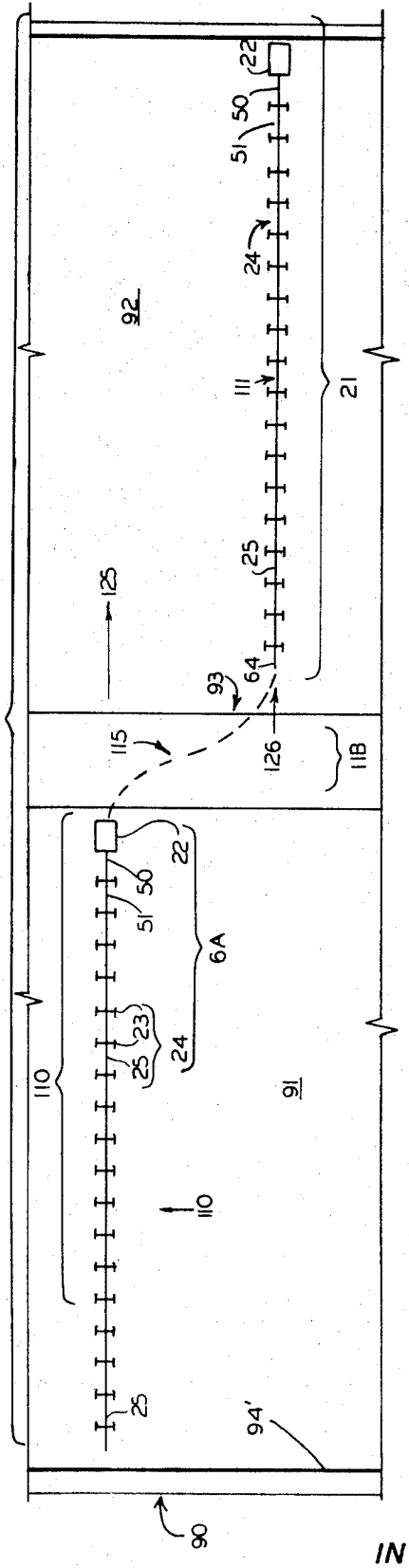
FIGS. 2 and 3 diagrammatically show, in the overall, the position of apparatus 21 in the basic sequence of steps providing, on repetition, the full cycle of operation in field 90 shown in FIG. 14.
Figure 3:
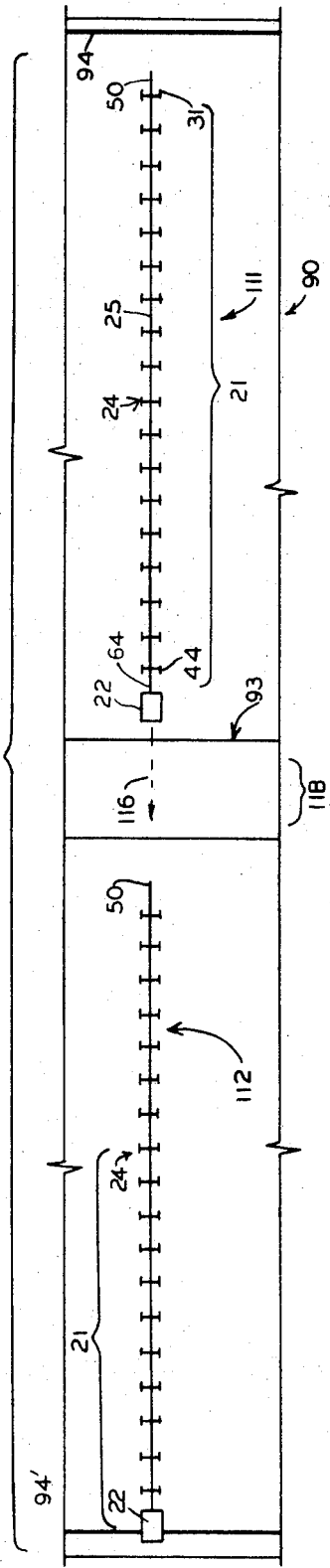
Figure 10:
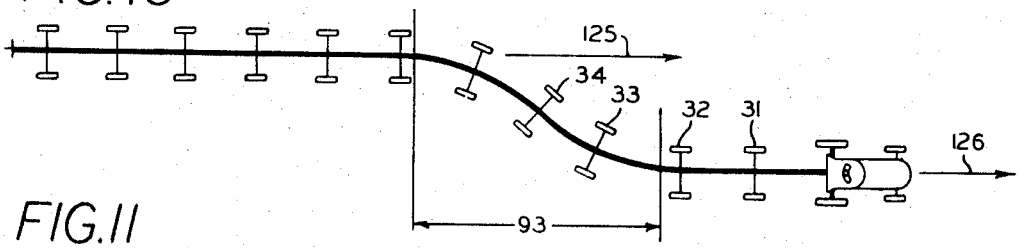
Figure 11:
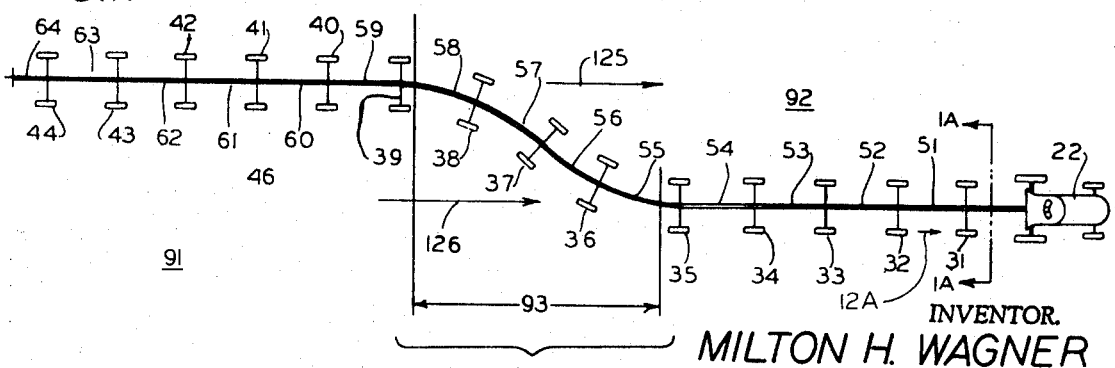
Figure 14:
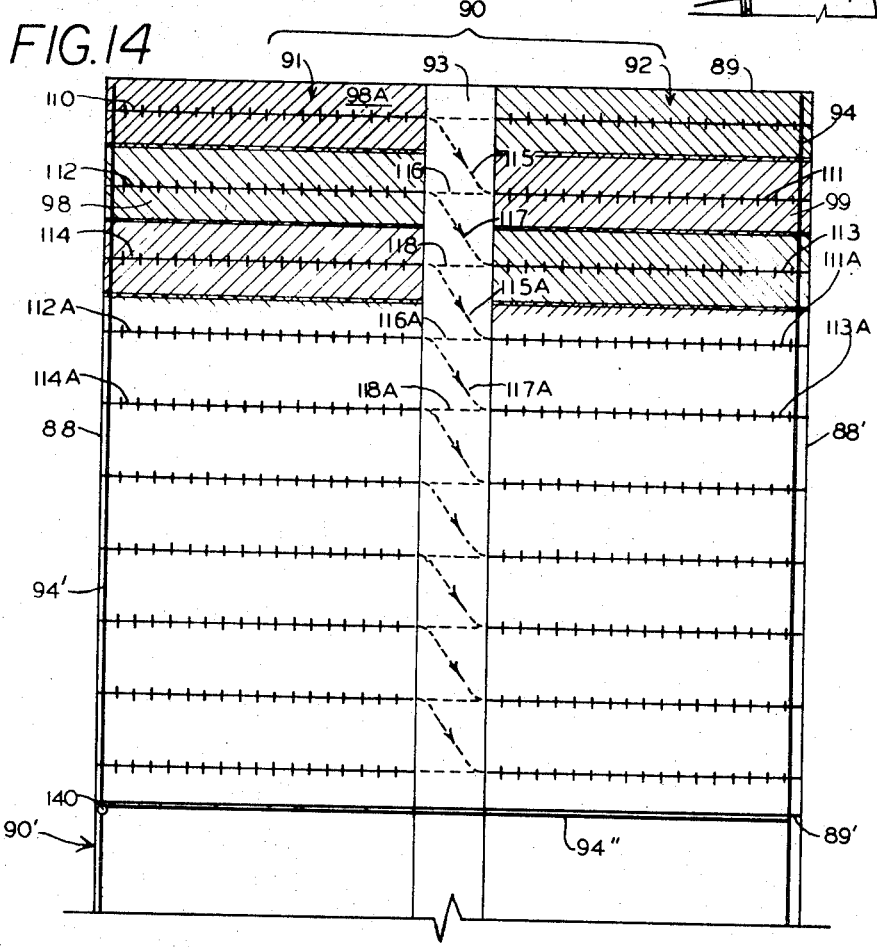
FIG. 14 is a diagrammatic view of the positions of the apparatus 21 on a field 90 during the process of operation of such apparatus.

In the overall operation of apparatus 21 in a rectangular field as 90 having an area of one-fourth section, i.e., 2,640 feet long and 2,640 feet wide, (length shown as vertical and width as horizontal in the FIGS. 2 through 11 and 14) having a left side portion 91 and a righthand portion 92 separated by a road 93, after operation as an irrigator, the apparatus 21 moves from the upper left position as shown as 110 in FIGS. 2, 11 and 14 to the position shown as 111 in FIGS. 2, 11 14, on the right-hand side of the road 93. By the repeated process of movement of portions of assembly 24 behind tractor 22 (a) in one straight line as 125 shown in FIG. 2 followed by (b) motion of sequential portions of apparatus 21 in an S-shaped or reversed curved path shown in FIGS. 6 through 11 and 6B, 7A, 7B, 8B, and 9B at an angle to path 125 through the zone 11B, in the direction 115 (shown in dotted line in FIGS. 14 and 2) followed by (c) motion of increasing sequential portions of apparatus 21 along another straight line of travel as 126 displaced from line 125 then (d) continuing along that second line of travel (126) as the number of the wheel units slowly decrease on the left of the road and increases on the right hand side of road 93. After all portions of the assembly 21 are thus brought to the position shown in position 111 with the tractor 22 at the righthand side of assembly 24 as shown in FIG. 3, the tractor 22 is connected to the former rear end unit 64 of the assembly 24 as shown in FIG. 3; thereafter the pipe string 25 of the assembly 24 is then operatively connected to a water line as 94 and thereafter the adjacent portion of field 90, i.e., the area as 99 is then irrigated. After irrigation of the area 99 by the passage of water through unit 24 is stopped the connection to pipe 94 is broken and tractor 22 draws unit 24 to the left. The front end of the pipe string portion 50 is firmly yet detachably attached to the hitch on the back of the tractor 22 during travel from position 110 to 111 when tractor 22 draws assembly 24 to position 111 and the rear end of pipe string portion 64 is firmly yet detachably attached to hitch 30 on the tractor 22 during travel from position 111 to position 112 when assembly 24 is there drawn by tractor 22.

The assembly 24 of wheeled unit and pipe string 25 is thus moved in a straight line along path 126 to the lefthand portion 91 of the filed 90 to a position as 112 in field 90 through straight line path 116 (shown in dotted lines); the wheeled pipe unit assembly is again connected to an irrigation line, as 94' and water is passed through the pipe string and sprinklers as 77 to the area 98 adjacent the position 112 of the assembly 24. The irrigating operation of the assembly 24 for area 98 at position 112 is the same as at position 110 for area 98A. The amount of area irrigated at area 98A at position 110 is the same as the area irrigated at positions 98 and 99. The area 98 and 98A slightly overlap. Following such irrigation of area 98 the tractor 22, earlier moved to and connected to the pipe unit, as 50, to the right (as shown in FIGS. 2, 6, 11 and 14) draws assembly 24 (after disconnection from line 94') by the above described straight and curved motions of apparatus 21 (referred to in some detail in regard to FIGS. 6–11) from the position 112 in FIG. 14 to that shown as position 113. Repetition of this process provides for a full coverage of field 90 with the apparatus 21 moving from position 113 to 114 as shown in FIG. 14 and then, as above described, to position 111A and then to position 112A and 113A and 114A as hereinabove described for the movement from one position 110 to position 111 and 112 until the entire rectangular field 90 is irrigated. The motion along (a) lines of travel indicated by dotted lines 115 between positions 110 and 111 and motion along lines of travel indicated as dotted line 116 between positions 111 and 112 herein described in some detail are the same as the motion along (b) lines of travel 117 between positions 112 and 113 and lines of travel 118 between positions 113 and 114 respectively.

Figure 6:
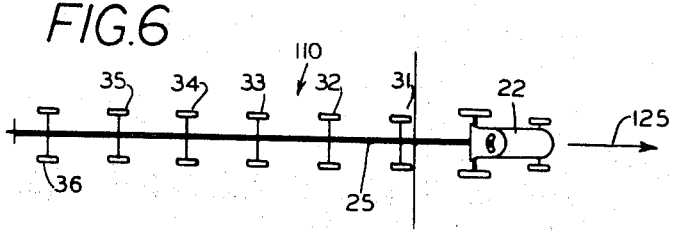
FIG. 6 is a diagrammatic top or plan view of the position of parts of apparatus 21 in zone 6A of FIG. 2.
Figure 7:
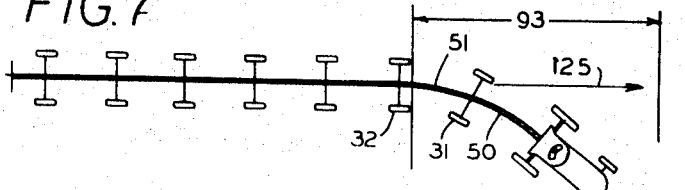

The process of operation of the apparatus 24 of which the overall sequence of irrigating operation has been above described is shown in more detail in FIGS. 6 through 11. In the operation of the steps shown in FIGS. 2 and 14 for movement from the position 110 to 111 the apparatus 21 is assembled as shown in FIGS. 2 and 14 and 6. With the unit 21 located at a position as 110 on the land portion 91 of the field 90 the tractor 22 draws unit 24 in a straight line 125 parallel to the axis of the pipe string 25 until the station 31 reaches a point adjacent to road 93 generally as shown in FIG. 6; tractor 22 is then turned to travel along a path with a direction of travel along a straight line, 127, which is at a large angle, i.e., 45°, to the length of the pipe string 25 to the left (as shown in FIGS. 2 and 6) of station 31, and the line, 125, of motion of the wheeled units then to the left (shown in FIGS. 2 and 6) of unit 32.

Figure 13:
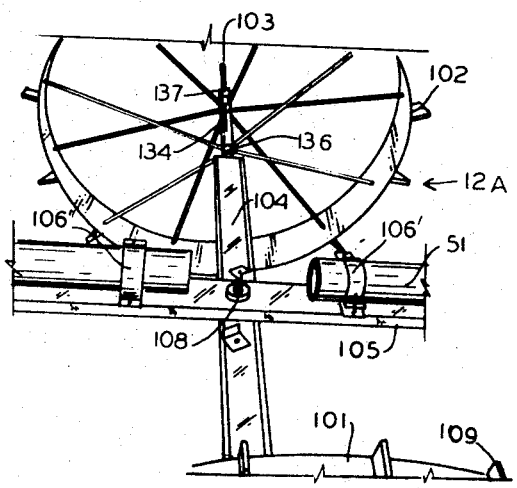
FIG. 13 is a top oblique view, as seen along the direction of the arrow 13A of FIG. 12, of the unit 31, that unit being partly broken away to show some structural details thereof.

As shown in FIG. 13, in wheel unit 31 the bracket 104 is pivotally mounted on clamp base 105, hence, as shown, in FIG. 6B wheels 101 and 102 of the unit 31 travel in paths parallel to the line of stress 151 applied thereto and the bracket 104 of the wheeled unit 31 is supported on the wheels 101 and 102 in a line perpendicular to the planes of the wheels 101 and 102. The wheels as 101 and 102 thus travel by rolling along the direction of the chord 151 of each arc or curved segment of pipe as 50 between the pivotal support of the pipe string 25 on unit 31 and the tractor attachment to the front end of the pipe string 25. The pivotally mounted wheels 101 and 102 on the base 105 provide no interference with each increment of curvature applied to the bendable pipe string by the tractor motion. Accordingly, as shown in FIGS. 6, 6B, 7, 7A, 7B, 8, and 8B, which illustrate the progressive stages of curvature of the pipe string 25, the bracket 104 of the unit 31 remains perpendicular to the line of stress applied to the front portion of the pipe string by the tractor 22 rather than having the direction of that bracket determined by the shape of the portion of the pipe string to which the station 31 is attached. As shown in FIGS. 6, 6B, 7A, 7B and 8 on increasing clockwise curvature of the pipe string by the tractor 22 in its travel along path 127 a clockwise (as seen from above) curvature is impressed upon the front portion of the pipe string as desired between two lines of travel 125 and 126 across the zone 11B traversing the road as 93 between positions 110 and 111.

In the wheeled units as 32-43 wherein the brackets as 204 are mounted firmly to the base as 205 to which the pipe string is attached and the bracket is fixed perpendicularly to the short segment of pipe to which such base is attached and the wheels as 201 and 202 of such units (32 through 43) roll in paths (shown as 153,153',153" in FIGS. 7A, 7B and 9B) tangent at their center to the axis of the portion or increment of curved pipe to which such bracket as 204 is attached; the cleated wheels of such units as 32-43 do not permit motion of that increment of pipe transversely to the length of axle of such wheel unit as shown in FIGS. 7A, 7B, 8B and 9B (while such motion is permitted in a unit as 31 wherein the bracket 104 assumes a position other than perpendicular to the length of the segment of pipe string to which attached). Accordingly, the first unit 31 (and the last unit 64 when the motion is reversed as shown in FIG. 3) moves along the direction of the chord of the curvature applied to the pipe string portion 50 of the pipe string 25 between the wheel unit 31 and the tractor 22. Such chordal direction is shown as 151 in FIG. 6B, 152 in FIG. 7A, 154 in FIG. 7B, 156 in FIG. 8B and 158 in FIG. 8B.

Figure 8:
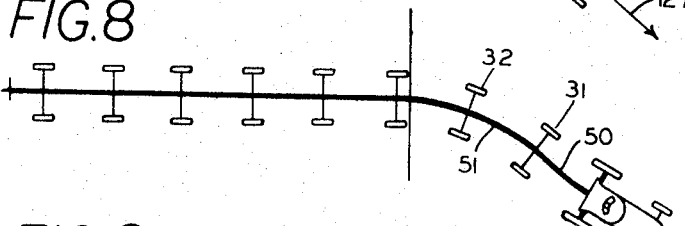
Figure 9:
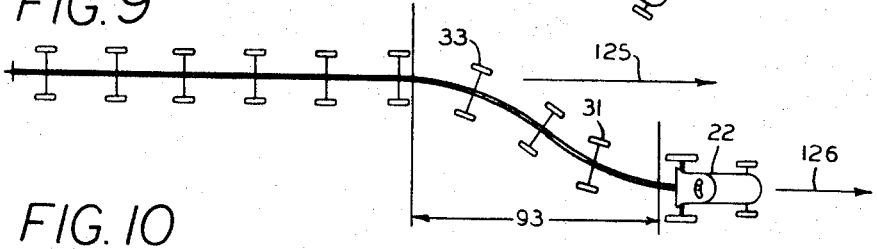

As shown in FIGS. 8B, 9 and 9B, on increasing counter-clockwise curvature of the pipe string 25 by the tractor 22 on its travel along path 126 a counter-clockwise (as seen from above) curvature is impressed upon the front portion of the pipe string 25 as desired between the lines of travel 125 and 126 across the zone 11B of the road as 93 between portions 110 and 111 and an ogee or reversed curvature of the pipe string 25 develops between lines of travel 126 and 126 as at 115.

As shown in FIGS. 9 and 9B the chord of the curvature applied to the portion 50 of the pipe string 25 between the wheel unit 31 and the tractor 22 becomes asymptotic to line 126 as tractor 22 moves along the line of position 111.

As shown in FIGS. 6, 6B, 7, 7A, 7B and 8, no bend in the pipe portion 51 occurs until, as shown in FIG. 6B, after that pipe unit portion has been moved to a position rightward (forward) of that at which the wheeled unit 31 was initially located at the position shown as 110. Similarly, pipe section 52 suffers no bend until after it has been moved forward, (right as shown in FIGS. 2 and 6) of the position formerly occupied by wheeled unit 31, that is, until wheeled unit 33 is in the position formerly occupied by wheeled unit 31 at position 110.

After wheeled unit 31 has moved about one half of the longitudinal distance which it travels before (as shown in FIG. 8B) travelling in the path 126 and after another unit 32 has also been displaced to one side (to the bottom of the sheet as shown in FIG. 9) as well as forwardly (to the right as shown in FIG. 9) the tractor 22 changes the direction of its path and turns to its left (rightwards as shown in FIGS. 8-11) and causes the pipe portions 50 and 51 to reverse the direction of clockwise curvature which had previously been impressed thereupon.

After the tractor 22 has reached the intended line of further travel 126 as shown in FIGS. 9, 10 and 11 the wheeled units immediately therebehind (as 31 and 32) are then drawn along to and in the straight line path 126 behind that tractor. The continued forward (to the right as shown in FIGS. 9B and 11) motion of the tractor 22 also applies tension along the pipe string 25 and causes the pipe sections 52 and 53 to then assume a curved relationship relative to the other sections of pipe as 54 and 55 (similar to that earlier in portions 52 and 53 relative to 54 and 55) while concurrently the tractor 22 travels along a straight line of travel 126 which is displaced laterally and longitudinally from the line of travel 125 of the portion of the pipe string 25 that is then located leftward (as shown in FIGS. 2 and 6) of the S-shaped portion and such continued movement of the tractor 22 along the line of travel 126 results in movement of all of portions of the pipe string 25 in a straight line behind the tractor 22 to position 111.

After the ogee curve is established, as shown in FIGS. 10 and 11, the wheeled units as 33 preserve the ogee curve thus formed in the pipe string 25 while the tractor 22 moves to the right as in FIGS. 10 and 11 as the ground engaging members as the cleats as 109 of the wheels as 101 and 102 and 201 and 202 and 201' and 202' of each wheeled unit as 31 and 32 through 44 of wheel train assembly 24, and rims as 333 and 334 of each wheel as 301 and 302 and 501 and 502 and 501' and 502' of each wheeled unit of the wheel train assembly 224 firmly grip the earth and serve to restrain the pipe to which such wheeled units are attached from motion parallel to the axles as 203 (or transverse to the length of pipe) at each of the plurality of points spaced apart along the length of the moving pipe at which such wheeled units are attached; these points of attachment with the pipe move with each portion of the pipe arrayed in the shape of a curve in a line tangent to that curve without further action of the operator to maintain such array. The structure of wheels of pipe train 224 as well as 24 is directed to resisting any usual thrust thereagainst transverse to the plane of the wheel rim, as 133 or 333, such thrust being parallel to the wheel axle at the zone of engagement of the wheel rim with the ground.

In summary, this invention provides as above described in some detail a process of irrigating a rectangular field 90 having two opposing longitudinally spaced apart sides 88 and 88' and two laterally spaced apart ends 89 and 89' and a water well 140 operatively connected to irrigating pipe lines as 94 and 94' and 94'' along the edge of the area irrigated. The lines 94 and 94' could be along the road 93. The process includes a series of repeated sprinkling maneuvers: the maneuver has two basic steps, one a motion to one side along the axis or direction of the pipe string 25 of the apparatus 24, and a return step. In the first step there is a drawing from one end thereof (the end at which the pipe string portion 50 is located) each of the series of portions of the serially connected pipe string 25 from a first position 110 at one side 91 of the field 90; the pipe portions as 31 and 44 extend longitudinally in said first position from a first point, the end of 64, at the one side 91 of the field 90 to a second point where the end of unit 50 is located near the middle of the field. In the first position 110 all of the series of pipe portions are in a straight line. The pipe string is moved along the direction of the length of the first straight line position 110 from the first point thereof as end of unit 64 to the second point, unit 31 position, past said second point to a second position 111 wherein such pipe portion extends longitudinally from a third point (left end of position 111) the position of the end station, as 44, of train 24, which position is near to the road 93 which runs along the middle of field 90, to a fourth point, the position of unit 31 in position 111 near the other side (88') of the field. In the second position the series of pipe string portions 25 are arrayed in a second straight line 111 parallel to the line of string 25 in position 110 and the third point is located laterally of and longitudinally beyond the second point; water is then passed from the well, as 140, and irrigation main lines as 94 and 94' through the pipe string and each of the nozzles as 77 on each station as 31 through 44 while the pipe string is in position 111 to the portion, as 99 of the field 90 adjacent to the assembly 24.

Thereafter the tractor 22 is moved to connect to and draw on pipe unit 64 and the pipe string 25 is drawn from the end 64 (opposite to unit 31) from position 111 along the direction of length of the second straight line (126) along position 111 to a third position 112 on side 91 of the field 90 whereat assembly 25 extends again in a (third) straight line from a point near the middle of the field to a point near the side 88 of the field 90 parallel to its earlier position 110 but displaced towards the end 89' of the field 90 a distance that provides for a reliable yet small overlap in the area covered by the sprinkling action of the nozzles as 77 on the pipe string 25 at positions 110 and 112.

Water from the well and line as 94 is then passed through pipe string 25 and its nozzles as 77 to the adjacent portion 98 of the field while pipe string is in position 112.

The process of moving to side 92 to position 113 duplicates the above described movement from position 110 to position 111 and sprinkling is performed at positions 113, with position 113 displaced towards the end 89' of the field 90 a distance that provides for a reliable yet small overlap in the area covered by the sprinkling action of the nozzles as 77 in the pipe string 25 at positions 111 and 113.

The process of this invention particularly provides that the drawing from position 110 to position 111 includes the steps of:

1. moving the series of portions of pipe string along the length of position 110 in a straight line while supporting the portions of pipe as 51-63 at each of a plurality of stations 31-43 above the ground at the stations spaced apart along the length of pipe string 25 while restraining each of said pipe string portions from movement transverse to its length at each of the points of support on the station 31-43;

2. moving the series of portions of pipe string 25 between the position of end station 31 in position 110 and the position of the end station 44 in position 111 in a curved path, 115, tangent at one, beginning, end to the line of pipe string 25 in position 110 and the other, finish, end of the curved path 115 is longitudinally displaced from the first, beginning, end thereof and is tangent to the straight line path 126 at position 111.

The curved path is continuous between its beginning and end. The moving of the series of pipe string portions over the curved path 115 is accomplished while supporting the portions of curved pipe string at each of the stations while those stations move with the pipe; movement of the intermediate pipe portions 51-63 along path 115 is in the direction of the tangent to the curved pipe portion supported at the station while the station wheels restrain the pipe from motion transverse to the length of the pipe at each of the station although the stations move with the pipe along paths 125, 116 and 126. Movement of the series of portions of pipe string 25 from the left (as shown in FIGS. 2 and 11) to the right hand portion (as shown in FIGS. 2 and 11) of position 111 is performed while supporting the portions of pipe at each intermediate station as 31-43 where again the connection of ground wheels, brackets and axles restrains each of said pipe string portions from movement transverse to its length at such stations notwithstanding the stress along the length of pipe string 25 along curve 115. The above process is then applied to an adjacent field as 90' as shown in FIG. 14 after field 90 is traversed as above described.

The process is characterized by that on initial motion of said pipe string 25 along path 115 one end of the pipe string is drawn along a path 127 at an angle (of about 45°) to the first straight line of path 125 and the pipe string 25 is curved between station 31, (the first point at which the pipe is supported behind its drawn end 50) and the front of drawn end 50. The pipe at station 31, (the first point at which the pipe 25 is supported behind the front drawn end of pipe 50) moves along the chords as 151, 152, 154, 156 or 158 of the curve of such curved pipe portion 50 which action serves to establish the S-curve between lines 125 and 126. However, the pipe is also curved between its point of support on station 31, (the first point at which the pipe is supported behind the first drawn end of pipe 50) and second support point at station 32 yet the pipe at station 32, as well as 33 and subsequent station, to 43 at each of such following or intermediate stations the support points move along the tangent 153,153' and 153'' of the curve of such curved pipe portions while 130 and 130' show line of travel of unit 32 along path 115 and so maintains the S-curve and permits a tensile force along line 126 to move the stations in line 125 in a straight line parallel to yet displaced from line 126.

The process of this invention also includes that process shown in FIGS. 4 and 5 wherein a first tractive drawing means, tractor 22, is attached to the end of the pipe string at which front end of pipe 50 is located in the position 110 and it (22) draws the pipe string 25 from position 110 to position 111, and another tractive drawing means, tractor 28, attaches to the end of the pipe string at which pipe unit 64 is; tractor 28, so located, is drawn by the pipe string and tractor 22 from the left end (as shown in FIG. 4) of position 110 to the left end of second position 111 while the pipe string moves from position 110 to position 111 and tractor 28 draws the pipe string as from the left end (as in FIG. 5) on the position 111 to the left end of the position 112 while the tractor 22 is drawn from the right end (as in FIGS. 5 and 3) of position 111 to the right end (as shown in FIG. 5) of the third position 112 thereby.

The process also includes that the motion of the tractors 22 and 28 be controlled automatically by a programmed series of commands applied to such tractors and initiated and terminated by remote command, as by radio control by conventional means therefor. Such remote control means on the tractive means to initiate and terminate the action thereof and operatively connected thereto would be a stop, start, left and right turn and control as provided by *Radio Control Handbook* — McEntee H.G.; Gernsback Library, Inc. 1961 pages 285 – 296 (radio controlled tractor) with the radio controlled motor controlling the throttle for a gasoline diesel engine for tractor 22 and a like control for tractor 28.

In a particular embodiment of apparatus 21 as above described the pipe 25 is formed of 4 inch o.d. thin walled, i.e., 10 gauge, steel or aluminum metal pipe that bends freely about 3 feet in a 30 foot length. While the spacing between lines of travel 126 and 125 is a matter of choice dependent upon the water pressure and distance of spray from nozzle as 77 with 30 feet between stations as 32 and 33 there is usually a 30 to 45 foot distance referred between closest postion of position 110 and 111 but 60 feet is usual with 45 feet between neighboring positions as 111 and 112. While the distance, as above described, between wheels as 101 and 102 is adjustable, as 32 inches to 40 inches between rows is usual such is also the usual distance between the wheels as 201 and 202 of one unit to avoid damage to such row crops, the height of the wheels as 101, 201, 102 and 202 is usually 30 inches, but could be made larger if desired, also the length of the unit 21 is usually 1,325 feet.

As the wind frequently changes in the time required for gradual sprinkling to be accomplished over such large areas as treated by the apparatus as 21 (and 27) the adaptability of the above described process using the apparatus 21 or 27 to vary the distance between positions that are spaced apart yet parallel as 110 and 112 and between positions as 111 and 113 permits that such distance between successive parallel positions compensates for the effect of varying wind velocity and direction on the ground location of the sprays of water from the nozzles as 77 to the field adjacent the pipe string. The location of position as 113 to another as 111 is readily controlled by the operator in manipulation of the apparatus 21 as the relations shown for movement from position 110 to 111 may be used in moving from position 111 to position 112 along a curved path as 115 as well as along the straight path 116 between such positions as 111 and 112. Such ready control of relative irrigating position provides for even distribution of water by positioning the apparatus so as to avoid excessive overlap of irrigated areas and to avoid failure to cover neighboring areas to be irrigated.

In another embodiment thereof, the apparatus 21 comprises, in operative combination, tractor 22 and a wheeled pipe train 224. The wheeled pipe train assembly 224 comprises a plurality of wheeled units 223 and a pipe string assembly 225. Assembly 225 is identical to pipe string assembly 25 above described. The wheeled units, as 231 and 232, of pipe train assembly 224 are identical in structure and function to the wheeled units as 31 and 32 of pipe train assembly 24 except for the difference in structure of the ground engaging wheels (as 301 and 302 of unit 231). Thus train 224 is the same as 24 except for difference in wheel structure; for example: wheeled unit 231 comprises a vertically extending left wheel 301 and an identical right wheel 302; left and right being as shown in FIGS. 1, 12 and 15 which are the same as the left and right relations of the driver of the tractor as shown in FIGS. 2–11, 13 and 14. Each wheel, as 301 (and 302) comprises a horizontally extending journal as 334 (and 334′, respectively, each rotatably supporting one end of a rigid horizontal axle 303 (identical to 103).

Wheels 501 and 502 of wheeled unit 232 and wheels 501′ and 502′ of wheeled unit 233 of pipe train assembly 224 are identical to each other and to wheels 301 and 302 of wheeled unit 231 of pipe train assembly 224.

Each of the wheels, as 301 (and 302 and 502 and 501 and 502′ and 501′) in assembly 224 is alike in size, shape and components and comprises a rigid rim as 333′, a plurality of spokes as 332′ and 342′ and a journal 334′ operatively connected as in wheel 301. As shown in FIGS. 15 and 16, corresponding parts are shown on wheel 302 correspondingly numbered but without a prime (′) as 334, corresponding to the showing in FIG. 1 for wheels 101 and 102.

Each axle as 303 (same as axle 103 of pipe train assembly 24) supports a rigid horizontal bracket as 304 (same as 104 of assembly 24) and the remainder of each of the components of each of the wheeled units as 231 and 232 of train assembly 224, such as brackets 105, fitting 78 standpipe 76 and sprinkler 77 of station 31 are cooperatively structurally connected and functionally related as above described for wheeled units 31 and 32.

Each rim as 333 is composed of a pair of coaxial equal diameter rigid inner and outer rim rings, 343 and 344, respectively. These rings are spaced apart along the direction of the length of the wheel axle, as 303. In the particular preferred illustrated embodiment, each rim ring is formed of one-half inch thick round, corrugated steel concrete reenforcement bar as are the spokes as 332. Each of the spokes as 332 and 342 of each wheel of assembly 224 is composed of one rigid main spoke member as 336 and 338 respectively and an auxiliary or branch spoke 337 and 339, respectively. Each main spoke member, as 336 and 338, respectively passes from one side of the journal of that wheel, to which journal it is firmly and rigidly attached, to the opposite rim; e.g., spoke 332 is firmly attached to and extends radially outward and laterally from the inner or central part of journal 334 toward and is firmly attached to the outer ring 343, while the main spoke member 338 of spoke 342, which spoke 342 neighbors to spoke 332 on wheel 302, is firmly attached to and extends radially outward and centrally from the outer or distal part of journal 334 to and is firmly attached to the inner or central rim ring 344. Each spoke of wheel 302; e.g., 332 also comprises an auxiliary or branch spoke as 337 which is rigid and firmly attached at one end to and extends radially and diagonally inwards from the main spoke member as 336 to and is firmly attached at its other end to the rim ring member (as inner rim ring 344) to which the main spoke member as 336 of that spoke is not attached. Similarly spoke 342 also comprises an auxiliary or branch spoke as 339 which is rigid and firmly attached to and extends radially and diagonally outwards from the main spoke member as 338 to and is firmly attached to the rim ring member, as outer rim ring 343, to which its main spoke member as 338 is not attached. This spoke structure provides for a firm and rigid location of the rings as 343 and 344 in a spaced apart relation to each other in a rigid wheel structure. Each wheel, as 301 and 302, is separately rotatably attached to the axle of that wheel and rotatably supports that axle, as 303. Each such wheel structure, on wheels 501, 502 and 501' and 502' as well as 301 and 302, because of such diagonal extension of the spokes is particularly firmly resistant to thrusts parallel to the axle of each of such wheels which thrust is exerted at a plane or zone at which the rim of such wheel contacts the ground. This diagonal orientation of the rigid wheel spokes, as shown in FIGS. 15 and 1, which are pictorial views, meets the thrust parallel to the axle, which is provided at the zone of contact of the rim of the wheel when one portion of the wheel train assembly 224 is travelling along a line of travel as 126 while another portion of the same pipe train assembly 224 is rolling along another path, as 125 parallel to 126 but displaced laterally therefrom, as shown in FIG. 15 and as also occurs with wheel train assembly 125 as shown in FIGS. 1-11.

This wheel structure of wheel 302, provides a firm ground engaging structure, as the bottom surface of the rings (as 343 and 344) firmly engage the ground. Such firm engagement of the rim rings of each wheel of each wheeled unit of assembly 224 with the ground resists thrust parallel to the axle of the wheel of which that rim forms a part while not inhibiting the motion of such wheel in a direction transverse to the axle thereof.

Figure 12:
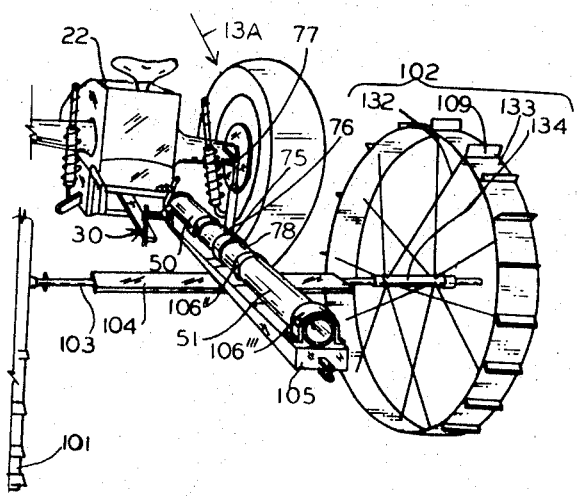
FIG. 12 is an enlarged view of the portion of the apparatus 21 as seen along the direction of the arrow 12A of FIGS. 11 and 13 to show details in that portion of the apparatus.

This ground engaging action of such ground engaging structure by wheels as 301, 302, 501, 502, 501' and 502' and all other wheel units of pipe train assembly 224 is a distinct improvement over, but qualitatively the same as provided by the cleats 109 and 109' and 209' on wheels as 102 and 101 and 201', respectively of wheel train assembly 24 (as shown in FIGS. 1 and 12) and all other wheel units of pipe train assembly 24. The structure of wheels as 301 and 302, 501 and 502 provides particularly rapid clearing of dirt and mud from the ground engaging surfaces thereof during movement thereof from positions as 110 to 111, and 111 to 112, as shown in FIGS. 2–11, 14 and 15, and a continuously efficient "biting" into the earth thereby to provide a firm engagement between such wheels and the ground to resist thrust parallel to the length of the axles of such wheels at the zone of contact between such wheels and the ground. Such biting contact and firm engagement for such purpose of such thrust resistance is obtained notwithstanding a concomitant reduction in the area of bearing surface between the ground and such wheels.

The outside diameter of the wheels 301 and 302 in the particular embodiment shown in FIG. 15 is 30 inches and the space between the rings forming each rim as 333 is 4 inches.

The width measured parallel to the length of the wheel axle of the rod from which the rim is made may vary from ⅜ inch to 1 inch depending directly on spacing of wheel units and wheel size. The thickness of the core measured radially from or perpendicular to the length of the wheel axle is also preferably at least the same size as the rim ring width for adequate rigidity but not much greater, to reduce cost and weight and also to provide adequate rigidity in view of weight against transverse thrust; i.e., in the direction parallel to the direction of length of the axle of such wheel. Rounded rod is particularly useful for such purpose.

The rigidity of the spokes and spacing of the rim rings is taken care of by use of the same rod material for spokes and rims.

The center-to-center spacing of rings 343 and 344 is preferably from 3 to 6 inches. Such spacing of the rings as 343 and 344 by a distance at least twice the diameter of the rods from which the rings are made and the rounded cross sectional shape of the rings provide for ready clearance of the mud that otherwise accumulates on the ground engaging means after their location at a zone (as shown as 98A in FIG. 14) near the position 110 of the apparatus 21 at which zone the ground of field 90 is sprinkled. Such provision for ready clearance of mud improves the "biting" or engagement of the rim in the ground (for resistance to transverse thrust as above described) during the motion of the apparatus 21 as from position 110 to 111.

The ability of the pipe train assemblies as 24 and 224 according to this invention to conform to impressed contours as above described renders such apparatus of particular utility in sprinkling narrow and complex shaped areas as in the vicinity of high tension wire towers and also the star-shaped areas between the circular areas which circular areas covered by conventional circular irrigation apparatuses and which star-shaped areas are not otherwise covered.

I claim:

1. Irrigation pipe train apparatus comprising a plurality of intermediate wheeled stations and a pair of end wheeled stations attached to a string of self-supporting pipe, a. said intermediate station each comprising a pair of ground engaging wheels, a journal at the center of each such wheel, an axle supported at each side thereof by the journals of said wheels, each wheel rotatable about said axle, a rigid rim at the periphery of said wheel, said rim firmly attached to said journal, a transverse thrust resistant ground engaging surface on said rim, a rigid axle bracket, a rigid pipe clamp base, pipe clamps on said bracket, said bracket supported on said axle, the length of said bracket fixed relative to the length of said axle, said pipe clamps firmly holding said clamp base to the adjacent portion of said string of pipe and said axle and said clamp base in fixed angular relationship, each wheel independently rotatable relative to said axle bracket, b. said end stations each comprising a pair of wheels, a journal at the center of each end station wheel, an end station axle supported at each side thereof by the journals of each end station wheel, each end station wheel rotatable about said end station axle, a rigid end station axle bracket, a rigid end station clamp base, pipe clamps on said end station bracket, said end station bracket supported on said axle, a rigid rim at the periphery of each said end station wheel, said rim firmly attached to said journal, and a ground engaging surface on said rim, the length of said end station bracket fixed relative to the length of said end station axle, said end station pipe clamps firmly holding said end station clamp base to the adjacent portion of said string of pipe and a pivotally movable operating connecting means between said end station pipe clamp base and said end station axle bracket, and c. sprinkler means operatively attached to said string of pipe, said string of pipe being composed of thin-walled bendable pipe elements serially connected and said stations are serially connected only by said string of pipe, said wheels mounted on said axles for rotation in planes each of which is parallel to the increment of length of pipe between said axles supporting said pipe along the entire length of said pipe string said wheels.

2. Apparatus as in claim 1 wherein the pipe string of one, first end portion of the pipe train apparatus extends in a straight line and a second end portion of the pipe string is arranged in another straight line parallel thereto and longitudinally and laterally displaced therefrom and a third intermediate portion of the pipe string is located between and connected to said end portions and is in the form of a stable ogee.

3. Apparatus as in claim 2 wherein said stations are about 30 feet apart along the length of said pipe string, said string being about 1,300 feet long and the flexibility of said pipe in said string is demonstrated by the resilient bendability of 30 feet of a length of said pipe of 3 feet transverse to said length when undistorted, and a straight line passing through the first straight portion of said pipe string adjacent said one end portion thereof is located at a transverse distance between 30 and 60 feet from a straight line passing through the second end portion of said pipe string.

4. Apparatus as in claim 3 comprising tractive means at both ends of said string of pipe each operatively connected to one end thereof.

5. Apparatus as in claim 4 comprising remote control means on said tractive means to initiate and terminate the action thereof and operatively connected thereto.

6. Apparatus as in claim 3 wherein the rim of each said wheel on said intermediate wheeled stations is formed of a plurality of rigid rings spaced apart from each other along the length of the axle of said wheel by at least twice the width of the rings as measured parallel to the length of the axle of said wheel, and wherein the diameter and thickness and width of said rings are approximately equal.

7. Apparatus as in claim 6 wherein said rings are formed of rigid metal of width measured parallel to said length of said axle in range of one half to 1 inch and thickness measured radially to length of said axle of one half to 1 inch with a center-to-center distance therebetween in range of 3 to 6 inches.

8. Apparatus as in claim 6 wherein each of said rim rings has a round cross-section.

* * * * *